Sept. 11, 1962 A. J. McANDREWS ET AL 3,052,955

METHOD AND APPARATUS FOR ASSEMBLING WHEEL HUB

Filed March 16, 1960 2 Sheets-Sheet 2

TO PRESS
HYDRAULIC CIRCUIT

INVENTORS
Anthony J. McAndrews
BY Richard V. Stumph
C. P. Barnard
ATTORNEY 3,052,955
Patented Sept. 11, 1962

1

3,052,955
METHOD AND APPARATUS FOR ASSEMBLING
WHEEL HUB
Anthony J. McAndrews, Elmira, N.Y., and Richard V. Stumph, Bedford, Ind., assignors to General Motors Corporation, Detroit, Mich., a corporation of Delaware
Filed Mar. 16, 1960, Ser. No. 15,379
16 Claims. (Cl. 29—148.4)

This invention relates to hub assembling apparatus and more particularly to an improved method of and an apparatus for assembling bearings and fastening members within and around a hub member.

In the manufacture of automobiles it has been found to be desirable to provide a wheel hub sub-assembly for a rapid and economical manufacture of the automobile. To this end, bearing members and fastening members, such as bolts spaced around the periphery of a hub, have been found to be most advantageously incorporated in the sub-assembly. In order to accomplish the assembly in a manner facilitating the structural ilimitations of both types of parts to be assembled, we have devised special apparatus which completes an assembly operation in a novel manner.

The object of our invention is to provide hub assembly apparatus adapted to forcibly assemble a plurality of parts having diverse strength characteristics; to provide assembly apparatus of simple construction and readily adaptable to press equipment; to provide a hydraulic circuit and arrangement of fluid motors to vary pressure application to the different assembly parts; and to provide a novel sequence of assembly operations.

Other objects and advantages will become apparent from the following detail description of the invention and the accompanying drawings wherein.

Figure 1:
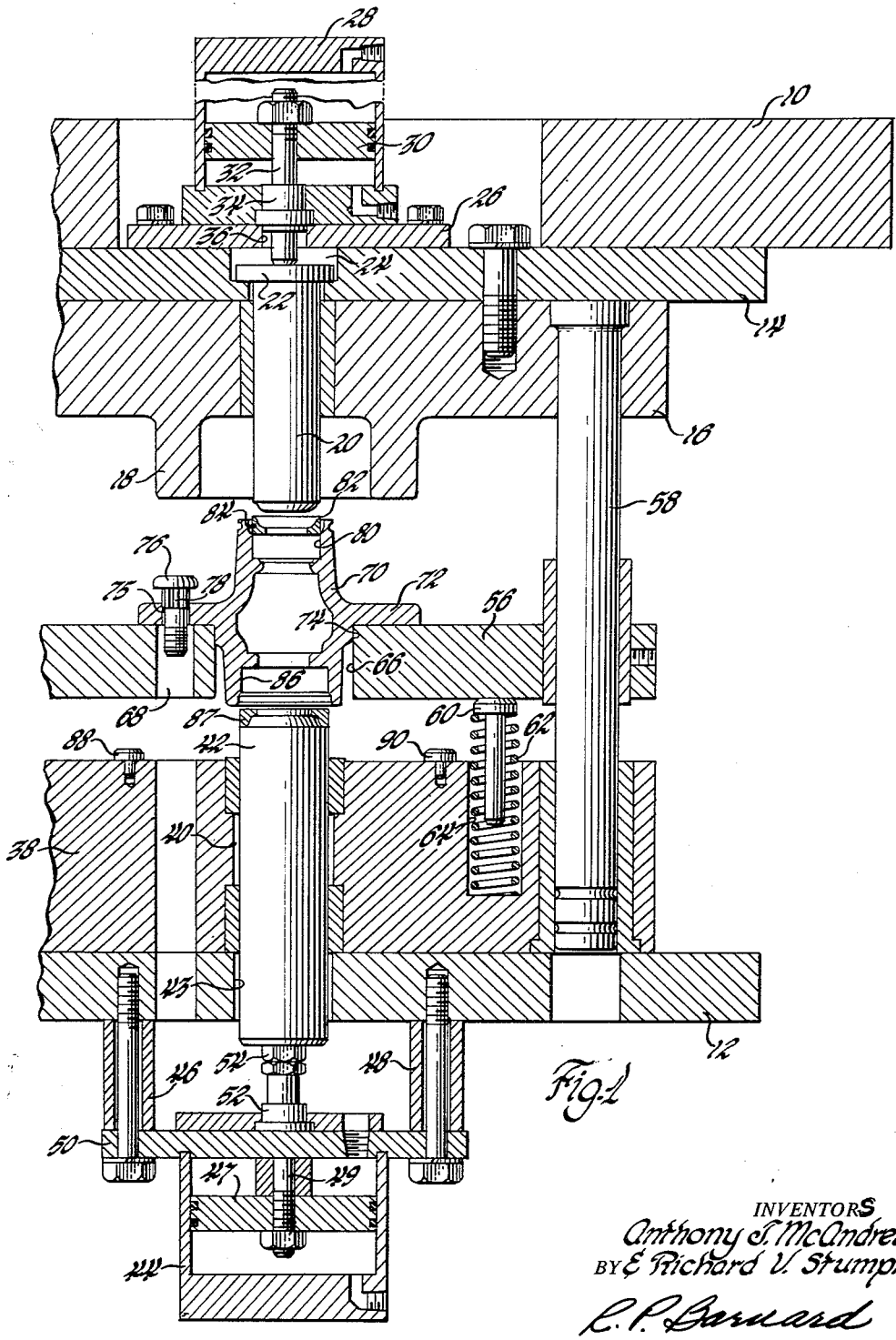
FIGURE 1 is a side elevational view, in section, of the assembly apparatus in the position prior to the assembly operation.

Referring now to FIGURE 1, the assembly fixture is located between an upper platen 10 and a lower platen 12 of a conventional hydraulic press (not shown). A support plate 14 has an upper surface adapted for engagement with the upper platen 10 and supports a bolt press plate 16 which is provided with a bolt engaging hub 18. A mandrel 20 is slidably supported within the bolt press 16 and the support plate 14. A flange 22 on one end of the mandrel 20 is confined within a counterbore 24 in the support plate 14 by a cover plate 26. An upper hydraulic cylinder 28 is fixed to the cover plate 26 and is provided with a piston member 30 and a piston rod 32 that extends downwardly through a sealing bushing 34 and a central bore 36 in the cover plate 26 to controllably engage the end surface of the mandrel flange 22.

A guide plate 38 is secured to the lower platen 12 and provided with a central aperture 40 that slidingly accommodates a lower mandrel 42 that extends downwardly through an aperture 43 provided in the lower platen 12. A lower hydraulic cylinder 44 is supported in spaced relation below the lower platen 12 by spacer sleeves 46, 48 and a cylinder plate 50. The lower hydraulic cylinder includes a piston 47 and a piston rod 49 that is connected through a sealing bushing 52 in the cylinder plate 50 to the lower end 54 of the lower mandrel 42.

Figure 2:
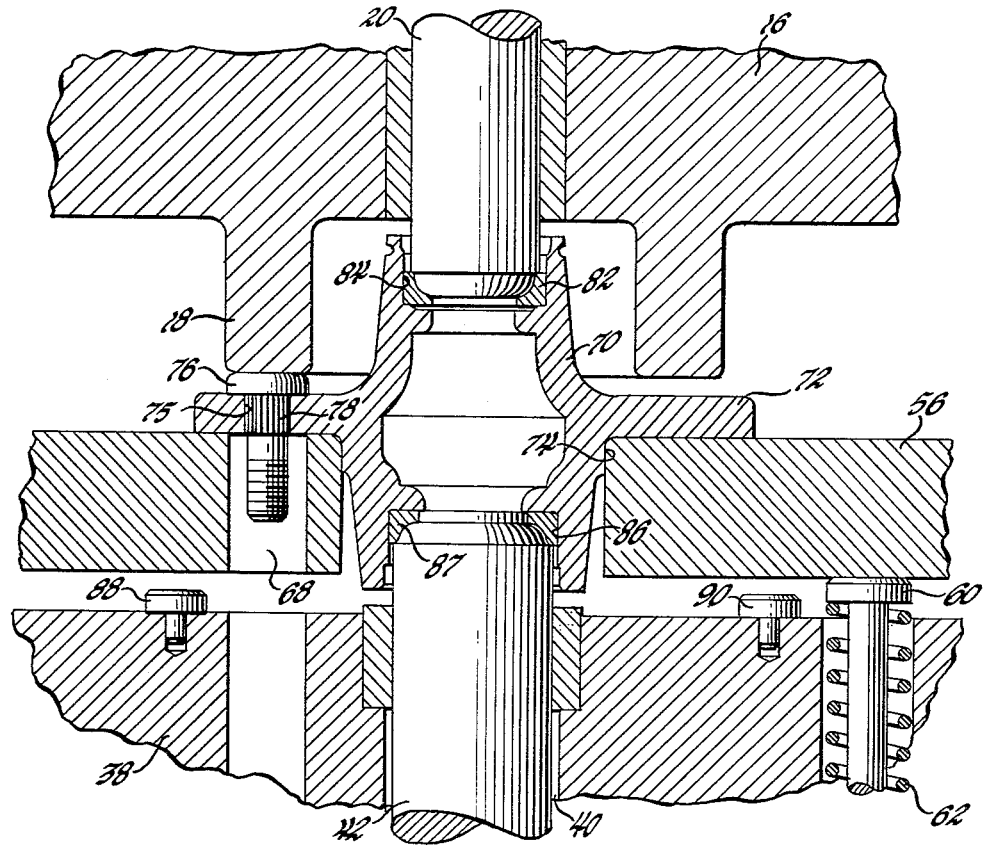
FIGURE 2 is a partial sectional view of the apparatus shown in FIGURE 1 in the position following the assembly operation.

Intermediate the bolt press 16 and the guide plate 38, a hub support and location plate 56 is slidably supported on a guide post 58 and supportably spaced from the guide plate 38 by a spacer pin 60 and a compression spring 62 seated in a bore 64 in the guide plate 38. It is to be understood that other guide posts and spacing pins are provided to suitably accommodate the hub support plate 56 and are not shown in the drawing. The hub support plate 56 is provided with a central aperture 66 and a plurality of radially, outwardly spaced apertures 68. A hub member 70 is rigidly supported within the aperture 66 by close fitting engagement of a hub flange 72 and a peripheral seat 74 with the interior of the hub support plate central opening and the upper surface of the hub locating plate. The hub member 70 is further provided with a plurality of bolt holes 75 circumferentially spaced about the flange 72 and accommodating bolt members 76 having a portion 78 of their shanks serrated and larger in diameter than the bolt holes 75 so that the bolts have a drive fit engagement within the holes 75. The upper end of the hub 70 is provided with a counterbore 80 which is adapted to drivingly receive an oversized bearing race 82 that is loosely seated in the flared end portion 84 of the hub 70. A bearing seat is also provided in the lower end of the hub 70 by a counterbore 86 which is adapted to drivingly receive an oversized bearing member 86 loosely supported on guide means provided on the upper end of the lower mandrel 42. A plurality of stops 88, 90 are provided on the upper surface of the guide plate 38 to abut the hub support plate 56 and limit the downward movement thereof. As shown in FIGURE 2, in the assembled position the bearing 82 is fixedly secured in the counterbore 84 and the bearing race 87 is fixedly secured in the counterbore 86. In addition, the fastening bolts 76 are fixedly secured in the bolt holes 75 by a force fit between the serrations 78 on the shank of the bolt and within the bolt holes 75.

Figure 3:
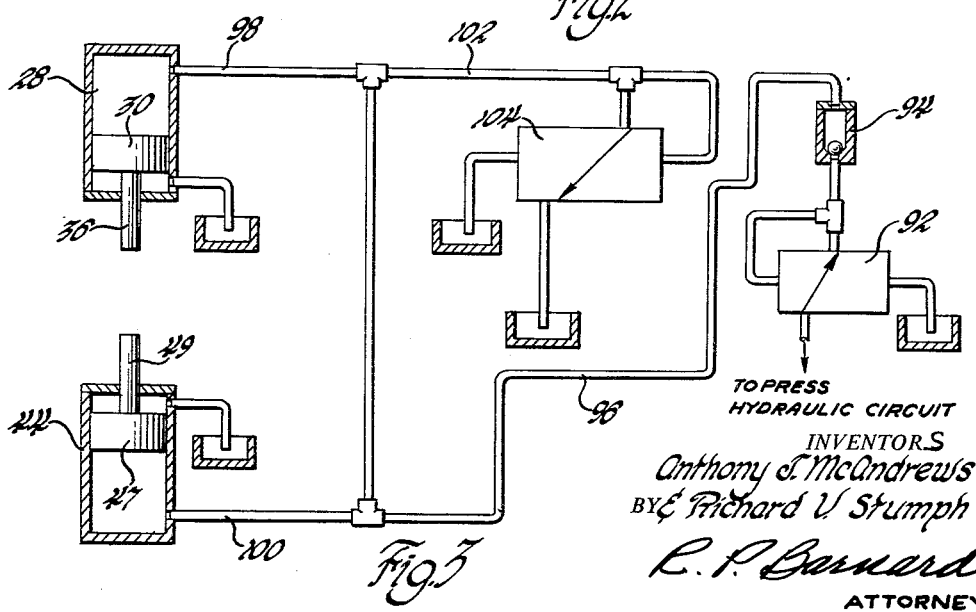
FIGURE 3 is a diagrammatic illustration of the assembly apparatus controls.

A special hydraulic control circuit is provided, as shown in FIGURE 3, to supply hydraulic fluid to the cylinders 28, 44. A control valve 92 supplies hydraulic fluid under pressure through a check valve 94 and a supply line 96 to the inlet passage 98 of the upper hydraulic cylinder 28 and to the inlet passage 100 of the lower hydraulic cylinder 44. The supply lines 96, 98, 100 are connected by a branch line 102 to a pressure relief valve 104 for a purpose to be hereinafter described.

In operation, with hydraulic pumps running and the press in the open position as shown in FIGURE 1, a hub member 70 is placed in the locating hole 66 in the hub support plate 56. The bearing race 82 is then loaded in the end of the counterbore 80 and the bearing race 87 is mounted on the top of the mandrel 42. In addition, bolt members 76 are placed in the bolt holes around the periphery of the hub flange 72.

After the hub assembly parts have been placed in position and with sufficient mandrel locking pressure in the upper cylinder 28, the support plate 14 and the bolt press 16 are forced downwardly by hydraulic pressure actuation of the upper platen 10. Continued maximum pressure in the upper cylinder 28 maintains the upper mandrel 20 in its lowermost position. This pressure in the upper cylinder is sufficient to prevent any movement of the upper mandrel throughout the bearing race assembly procedure, and the force of the compression springs 62 is also sufficiently great to prevent any downward movement of the hub support plate 56 during the assembly of the upper bearing race 82. The initial portion of the press stroke guides the upper mandrel 20 into engagement with the upper bearing race 82 and forces the upper bearing race into the counterbore 80 of the hub 70 and against a seat provided therein. As the press pressure is increased following the assembly of the upper bearing race 82 into the counterbore 80, the hub support plate 56 is forced downwardly to overcome the upward bias of the compression springs 62 exerted through the spacing pins 60. The springs 62 are compressed sufficiently to allow the hub 72 to engage the lower bearing race 87, and continued pressure application forces the hub and the hub support plate downwardly about the lower mandrel 42 to seat the race ring 87 within the counterbore 86. The hydraulic pressure in the lower cylinder 44 is sufficient throughout the lower race assembling operation to prevent downward movement of the lower mandrel 42 and rigidly absorb the downward pressure of the press. When the lower bearing race is assembled, the press pressure increases slightly to cause an increase in the hydraulic pressure in both the upper and lower hydraulic cylinders and their supply lines. The relief valve 104 is actuated by the additional pressure to permit flow of the hydraulic fluid in the cylinders and their supply lines to a tank. Thus, the press is permitted to continue downwardly to force the bolt press 16 downwardly to engage the bolt press hub 18 with the tops of the bolts 76. During this motion the bolt press 16 moves relative to the upper mandrel 20 since the pressure fluid in the cylinder 28 is being exhausted at this time. To accommodate the excessive force needed to assemble the bolts 76 in their holes, the hub support plate 56 is forced further downwardly until it seats on the stop 88, 90 of the guide plate 38. During this downward movement the lower mandrel 42 is accommodatingly lowered as hydraulic fluid is exhausted from the cylinder 44. Further downward motion of the press causes the bolts to be driven home in the bolt holes of the hub 70 while the entire assembly is directly supported on the guide plate 38 and lower platen 12 by the stops 88, 90. In this manner neither of the bearing races 82 or 87 is required to withstand the high pressures required for assembly of the bolts. At the completion of the bolt assembly, the press stroke reverses and raises the upper platen 10, support plate 14 and bolt press 16 to their original positions. The compression springs 62 force the hub support plate upwardly to its original position and the assembled hub may then be removed and parts for a new assembly positioned thereon to repeat the assembly cycle.

It is to be noted that the pressures necessary to seat the bearing races 82, 87 in the hub 70 are considerably less than the pressures required to assemble the bolt members 76 within the bolt holes provided on the hub flange. In addition, the pressures necessary to assemble the bolts would, in many instances, adversely affect the bearing races. Therefore, it should be appreciated that the assembly of the race members is more readily accomplished by separate assembly of the race members rather than by simultaneous assembly thereof with the bolt members. The race members are separately assembled because simultaneous assembly of the bearing races would require the timing of force application to both the upper and lower races to be extremely accurate to prevent misalignment of the upper and lower bearing members within the counterbores 80, 86 due to uneven pressure application or variations in rate of assembly of the bearing members. Furthermore, in order to provide apparatus which is easily loaded for the assembly operation, it is necessary that the hub member be freely mounted on the hub support plate and, therefore, there is no backing member to absorb upward forces against the hub member before the upper mandrel 20 is engaged with and seats the upper bearing race 82.

While we have shown only the preferred form of our invention, it should be understood that various changes or modifications of the details of construction and the arrangement of the parts may be made within the scope of the appended claims without departing from the spirit of the invention.

We claim:

1. Hub assembling apparatus for assembling bearing members and fastener members on a hub having bearing and fastener receiving portions, and comprising: upper and lower platens of a press mechanism, hub supporting means positioned between said platens, drive members slidably associated with each of said platens, hydraulic cylinders controllably linked to each of said drive members to control the positions thereof relative to said platens, locating means on said hub supporting means for positioning said hub to align the bearing receiving portions with said drive members, guide means provided on said drive members to accommodate assembly bearing members to be drivingly associated with said hub, a fastener press plate fixed to one of said platens, a portion of said press plate axially aligned with said fastener receiving portions of said hub and adapted to drivingly engage assembly fastener members with said hub, power means associated with said press mechanism for closing said platens, variable spacing means for variably positioning said hub supporting means relative to said drive members and said platens and having at least three variable assembling positions, one of said positions permitting driving association of one of said bearing members with said hub by one of said drive members, another of said positions permitting driving association of another of said bearing members with said hub by another of said drive members, another of said positions accommodating driving association of said fastener members with said hub by said press plate and each of the driving associations being completed independently of the others.

2. Hub assembling apparatus for assembling bearing members and fastener members on a hub having bearing and fastener receiving portions, and comprising: upper and lower platens of a press mechanism, hub supporting means positioned between said platens, drive members slidably associated with each of said platens, hydraulic cylinders controllably linked to each of said drive members to control the positions thereof relative to said platens, locating means on said hub supporting means for positioning said hub to align the bearing receiving portions with said drive members, guide means provided on said drive members to accommodate assembly bearing members to be drivingly associated with said hub, a fastener press plate fixed to one of said platens, a portion of said press plate axially aligned with said fastener receiving portions of said hub and adapted to drivingly engage assembly fastener members with said hub, power means associated with said press mechanism for closing said platens, variable spacing means for variably positioning said hub supporting means relative to said drive members and said platens and having at least three variable assembling positions, one of said positions permitting driving association of one of said bearing members with said hub by one of said drive members, another of said positions permitting driving association of another of said bearing members with said hub by another of said drive members, another of said positions accommodating driving association of said fastener members with said hub by said press plate, hydraulic control means to maintain a drive member locking pressure in said cylinders during driving association of said bearing members with said hub, and to permit said drive members to slide relative to said platens during driving association of said fastener members with said hub.

3. In apparatus of the character described, a work holder in the form of a plate having a central work locating means and adapted to retainingly support an assembly part receiving member, a force applying member axially aligned with and spaced above an assembly part to be drivingly associated with the assembly part receiving member, another force applying member axially aligned with and spaced below another assembly part to be drivingly associated with said assembly part receiving member, additional force applying assembly means radially spaced outwardly of said work locating means and aligned with another assembly part to be drivingly associated with said assembly part receiving member, a power source, means to transfer power to said force applying assembly members, and means controlling application of assembly force to said assembly receiving member and providing for sequential assembling force application in series to said force applying member, to said other force applying member and to said additional force applying member.

4. A hub assembly fixture associated with a power press having spaced upper and lower platens, a support plate fixed to one of said platens and having a central bore extending therethrough and axially aligned with a hole in said one platen, a power transfer member fixed to said support plate and having a through bore axially aligned with said central bore, a drive rim adapted for driving association with an assembly part and concentrically positioned relative to said through bore and extending outwardly from said power transfer member, a first mandrel member slidably mounted in said bores and having a stop associated therewith to limit axial movement thereof outwardly away from said press member, a hydraulic cylinder mounted in said hole in said one platen, a piston operative within said cylinder and controllably linked with said mandrel in said central bore, a guide rod fastened to said press member and extending within a coaxial guide hole in the other of said platens, a guide plate supported by said other platen and having a guide hole coaxially accommodating said guide rod, another mandrel member slidably supported within a central bore extending through said guide plate and said other platen, a hydraulic cylinder mounted on said other platen, a piston operative within said cylinder and controllably associated with said other mandrel, variable support means extending outwardly away from said guide plate, an assembly support plate variably positionable outwardly away from said guide plate on said variable support means, means to position an assembly part receiving member on said assembly support plate in alignment with said mandrels and said power transfer member, guide means provided on the outwardly spaced ends of each of said mandrels to accommodate assembly parts to be associated with said assembly part receiving member, cylinder control means to permit power transfer through the mandrels during assembly of assembly parts associated with the mandrels and to prevent power transfer through the mandrels during assembly of assembly parts associated with said rim, and press control means to force said platens toward each other to sequentially drive said first mandrel and an associated assembly part into assembled position on said assembly part receiving member, drive said second mandrel and an associated assembly part into assembled position on said assembly part receiving member, and drive said power transfer member and an associated assembly part into assembled position on said assembly part receiving member.

5. An assembly fixture associated with a power press having upper and lower platens, movable support means for supporting an assembly part receiving member between said platens, spring means for positioning said support means between said platens, assembly part driving means operatively associated with each of said platens, guide means provided on each of said drive means to accommodate assembly parts to be drivingly associated with the assembly part receiving member, press control means for closing said platens by an assembly stroke of one platen relative to the other platen, the assembly part driving means associated with said one platen and an associated assembly part being driven into assembled position on said assembly part receiving member during the initial portion of said assembly stroke, said spring means being positioned between said one platen and said other platen and being sufficiently incompressible to rigidly immovably support said movable support means during the initial portion of said assembly stroke to prevent driving engagement movement thereof relative to the assembly part driving means associated with said other platen, and said spring means being sufficiently compressible after the initial portion of said assembly stroke to permit movement of said movable support means and driving engagement of the driving means associated with said other platen and an associated assembly part with said assembly part receiving member.

6. An assembly fixture associated with a power press having upper and lower platens, movable support means for supporting an assembly part receiving member between said platens, spring means for positioning said support means between said platens, assembly part drive means operatively associated with said platens, additional assembly part drive means operatively associated with one of said platens, guide means provided on each of the assembly part drive means to accommodate associated assembly parts to be drivingly associated with the assembly part receiving member, press control means for closing said platens by an assembly stroke of said one of said platens relative to the other of said platens, said assembly part drive means associated with said one platen and an associated assembly part being driven into assembled position on said assembly part receiving member during the initial portion of said assembly stroke, said spring means being positioned between said one platen and said other platen and being sufficiently incompressible to rigidly immovably support said movable support means during the initial portion of said assembly stroke to prevent driving engagement movement thereof relative to the assembly part driving means associated with said other platen, said spring means being sufficiently compressible during an intermediate portion of the assembly stroke after the initial portion of said assembly stroke to permit movement of said movable support means, said assembly part drive means associated with said other platen and an associated assembly part being driven into assembled position on said assembly part receiving member during the intermediate portion of said assembly stroke, stop means positioned between said platens to rigidly support said movable support means during the final portion of said assembly stroke, and said additional assembly part drive means and an associated assembly part being driven into assembled position on said assembly part receiving member during the final portion of said assembly stroke.

7. An assembly fixture associated with a power press having upper and lower platens, movable support means for supporting an assembly part receiving member between said platens, spring means for positioning said support means between said platens, assembly part drive means movably supported relative to each of said platens in alignment with said assembly part receiving member, movement control means controllably associated with each of said assembly part drive means for locking engagement thereof relative to said platens, additional assembly part drive means fixedly secured to one of said platens, guide means provided on each of the assembly part drive means to accommodate associated assembly parts to be drivingly associated with the assembly part receiving member, press control means for closing said platens by an assembly stroke of said one of said platens relative to the other of said platens, said assembly part drive means associated with said one platen being locked thereto by said movement control means in a position causing said assembly part drive means to engage said assembly part receiving member before said additional assembly part drive means is drivingly engaged therewith, said assembly part driving means associated with said one platen and an associated assembly part being driven into assembled position on said assembly part receiving member during the initial portion of said assembly stroke, said spring means being positioned between said one platen and said other platen and being sufficiently incompressible to rigidly immovably support said movable support means during the initial portion of said assembly stroke to prevent driving engagement movement thereof relative to the assembly part drive means associated with said other platen, said assembly part drive means associated with said other platen being locked thereto by said movement control means in a position of non-engagement during said initial portion of said assembly stroke, said spring means being sufficiently compressible during an intermediate portion of the assembly stroke after the initial portion of the assembly stroke to permit movement of said movable support means, said assembly part drive means associated with said other platen and an associated assembly part being driven into assembled position on said assembly part receiving member during the intermediate portion of said assembly stroke, stop means positioned between said platens to rigidly support said movable support means during the final portion of said assembly stroke, means to actuate said movement control means at the end of said intermediate portion of said assembly stroke to unlock said assembly part drive means to permit movement thereof relative to said platen and cause power transferring disassociation therebetween during the final portion of said assembly stroke, and said additional assembly part drive means and an associated assembly part being driven into assembled position on said assembled part receiving member during the final portion of said assembly stroke.

8. A method of drivingly associating assembly parts of different strength characteristics in a common assembly part receiving member comprising the steps of positioning the assembly part receiving member in a power press, aligning assembly part drive means with the assembly parts and the assembly part receiving member, simultaneously and continuously applying power to said drive means, controlling engagement of said drive means and associated assembly parts with said assembly part receiving member during the simultaneous and continuous application of power to said drive means to sequentially drivingly engage said assembly parts with said assembly part receiving member.

9. A method of power association of assembly parts with an assembly part receiving member comprising the steps of positioning the assembly part receiving member in a power press, positioning the assembly parts in alignment with corresponding assembly part receiving portions of the assembly part receiving member, and sequentially drivingly engaging each of the assembly parts within the assembly part receiving portions during a stroke of the power press by the simultaneous and continuous exertion of driving power through said press on driving means engaged with said assembly parts during said stroke.

10. A method of power association of assembly parts with an assembly part receiving member comprising the steps of positioning the assembly part receiving member in a power press, positioning the assembly parts in alignment with corresponding portions of the assembly part receiving member, sequentially driving each of the assembly parts into assembled position on said assembly part receiving member during a stroke of the power press by the simultaneous and continuous exertion of driving power by said press on driving means engaged with said assembly parts during said stroke, and disassociating assembly parts of diverse strength characteristics from power transferring relationship with the power press during the assembly of other parts.

11. A method of assembling fastener members and bearing members in a hub member by driving association during a closing stroke of a power press comprising the steps of positioning and aligning the assembly fastener members and bearing members adjacent corresponding receiving portions of the hub member, applying power through the power press to drive means associated with each of the bearing members, sequentially drivingly associating each bearing member with the corresponding receiving portion of the hub member, disassociating the drive means for the bearing members from power transferring association with the power press, applying power through the power press to drive means associated with the fastener members, and drivingly associating the fastener members with the corresponding receiving portions of the hub member.

12. The method of assembling a plurality of assembly parts of diverse strength characteristics of a work piece during continuous one-way movement of one of a pair of relatively movable platens having separate assembly part engaging portions during a single stroke of a press and comprising the steps of: positioning a work piece having assembly part receiving portions between said relatively movable platens; mounting said assembly parts between said relatively movable platens in assembling alignment with said assembly part receiving portions of said work piece; actuating said press and causing continuous movement of one of said relatively movable platens toward the other of said relatively movable platens; engaging first assembly parts having similar strength characteristics during an initial portion of the continuous movement of said one of said relatively movable platens with one of said separate assembly part engaging portions and applying force therethrough from said one of said relatively movable platens to drive said parts into assembled position on said work piece; disengaging said one of said separate assembly part engaging portions of said one of said relatively movable platens from force transferring asosciation with said one of said relatively movable platens after said first assembly parts are assembled; and thereafter engaging second assembly parts having diverse strength characteristics relative to said first assembly part during a subsequent portion of the continuous movement of said one of said relatively movable platens with another of said separate assembly part engaging portions and applying force therethrough from said one of said relatively movable platens to drive said second assembly parts into assembled position on said work piece without force application to said first assembly part.

13. The method of assembling a plurality of assembly parts of diverse strength characteristics on a work piece during continuous one-way movement of one of a pair of relatively movable platens having separate assembly part engaging portions during a single stroke of a press and comprising the steps of: positioning a work piece having assembly part receiving portions between said relatively movable platens; mounting said assembly parts between said relatively movable platens in assembling alignment with said assembly part receiving portions of said work piece, actuating said press and causing continuous movement of one of said relatively movable platens toward the other of said relatively movable platens; separately engaging first assembly parts having similar strength characteristics during an initial portion of the continuous movement of said one of said relatively movable platens with separate assembly part engaging portions and alternately and successively applying force therethrough from said one of said relatively movable platens to alternately and separately drive said first assembly parts into assembled position on said work piece; disengaging said separate assembly part engaging portions for said first assembly parts having similar strength characteristics from force transferring association with said one of said relatively movable platens after said first assembly parts are assembled; and thereafter engaging second assembly parts having diverse strength characteristics relative to said first assembly parts during a subsequent portion of the continuous movement of said one of said relatively movable platens with another of said separate assembly part engaging portions and applying force therethrough from said one of said relatively movable platens to drive said second assembly parts into assembled position on said work piece without force application to said first assembly parts.

14. Assembling apparatus for assembling a plurality of assembly parts having diverse strength characteristics on a work piece having corresponding assembly part receiving portions and comprising: upper and lower platens of a press mechanism, work piece supporting means positioned between said platens, drive members associated with said platens, control means linked to each of said drive members to fix or release and to control the positions thereof relative to said platens, means for positioning said work piece to align the assembly part receiving portions with said drive members, means to locate said assembly parts in alignment with and between said assembly part receiving portions and said drive means, power means associated with said press mechanism for closing said platens in a continuous relative movement, variable spacing means for variably positioning said work piece supporting means relative to said drive members and said platens and having at least three variable assembling positions, one of said positions permitting driving association of one of said assembly parts with said work piece by one of said drive members, another of said positions permitting separate driving association of another of said assembly parts with said work piece by another of said drive members, and another of said positions permitting separate driving association of another of said assembly parts with said work piece by another of said drive members, and each of the driving associations being completed independently of the others during continuous relative movement of said platens.

15. Hub assembling apparatus for assembling hearing members and fastener members on a hub having hearing and fastener receiving portions, and comprising: upper and lower platens of a press mechanism, hub supporting means positioned between said platens, drive members associated with each of said platens, control means linked to each of said drive members to fix and release and to control the positions thereof relative to said platens, to align the bearing receiving portions and the fastener receiving portions with said drive members, means to support said bearing members and said fastener members in assembling alignment between said hub and said drive members, power means associated with said press mechanism for closing said platens, variable spacing means for variably positioning said hub supporting means relative to said drive members and said platens and having at least three variable assembling positions, one of said positions permitting driving association of one of said bearing members with said hub by one of said drive members, another of said positions permitting driving association of another of said bearing members with said hub by another of said drive members, another of said positions accommodating driving association of said fastener members wtih said hub by another of said drive members, and each of the driving associations being completed independently of the others.

16. An assembly fixture associated with a power press having upper and lower platens, support means for supporting an assembly part receiving member between said platens, first means for variably positioning said support means between said platens, assembly part driving means operatively associated with at least one of said platens, second means to locate assembly parts to be drivingly associated with the assembly part receiving member in assembling alignment therewith, means for closing said platens by continuous relative movement therebetween, assembly part driving means associated with said one platen to drive an associated assembly part into assembled position on said assembly part receiving member during the initial portion of said continuous relative movement of said platens, said first means being positioned between one platen and said other platen and being initially sufficiently incompressible to rigidly and immovably support said support means during the initial portion of said continuous relative movement of said platens to prevent driving engagement thereof relative to the other assembly part driving means, and said first means being sufficiently compressible after the initial portion of said continuous relative movement of said platens to permit movement of said support means and driving engagement of the other driving means and an associated assembly part with said assembly part receiving member.

References Cited in the file of this patent

UNITED STATES PATENTS

| | | |
|---|---|---|
| 595,108 | Levedahl | Dec. 7, 1897 |
| 1,643,977 | Buckwalter | Oct. 4, 1927 |
| 1,817,462 | Phelps | Aug. 4, 1931 |
| 2,660,780 | Beck | Dec. 1, 1953 |